(12) United States Patent
Tabata

(10) Patent No.: US 8,441,568 B2
(45) Date of Patent: May 14, 2013

(54) IMAGE APPARATUS PRIORITIZING DISPLAYED ATTRIBUTE INFORMATION FOR RECOGNIZED PEOPLE

(75) Inventor: Kazumasa Tabata, Osaka (JP)

(73) Assignee: Panasonic Corporation, Osaka (JP)

( * ) Notice: Subject to any disclaimer, the term of this patent is extended or adjusted under 35 U.S.C. 154(b) by 56 days.

(21) Appl. No.: 12/974,417

(22) Filed: Dec. 21, 2010

(65) Prior Publication Data
US 2011/0267529 A1 Nov. 3, 2011

(30) Foreign Application Priority Data
Jan. 6, 2010 (JP) .................................. 2010-000967

(51) Int. Cl.
*H04N 5/222* (2006.01)
(52) U.S. Cl.
USPC .................................. 348/333.02; 348/333.11
(58) Field of Classification Search ............. 348/333.02, 348/333.11; 396/296
See application file for complete search history.

(56) References Cited

U.S. PATENT DOCUMENTS

2004/0207743 A1* 10/2004 Nozaki et al. ............. 348/333.12
2010/0013994 A1* 1/2010 Li .................................. 348/468

FOREIGN PATENT DOCUMENTS

JP 2006-165822 6/2006

* cited by examiner

*Primary Examiner* — Sinh Tran
*Assistant Examiner* — Paul Berardesca
(74) *Attorney, Agent, or Firm* — Wenderoth, Lind & Ponack, L.L.P.

(57) ABSTRACT

An imaging apparatus includes a storage unit configured to store attribute information about a person and information about a priority of the person with the attribute information associated with the information about a priority, an imaging unit configured to capture a subject to generate image data, and a display unit configured to display attribute information of a person included in an image represented by the image data generated by the imaging unit. When displaying plural pieces of attribute information for a plurality of people with the plurality pieces of attribute information being overlapped, the display unit displays attribute information of a person having a higher priority above attribute information of a person having a lower priority.

6 Claims, 10 Drawing Sheets

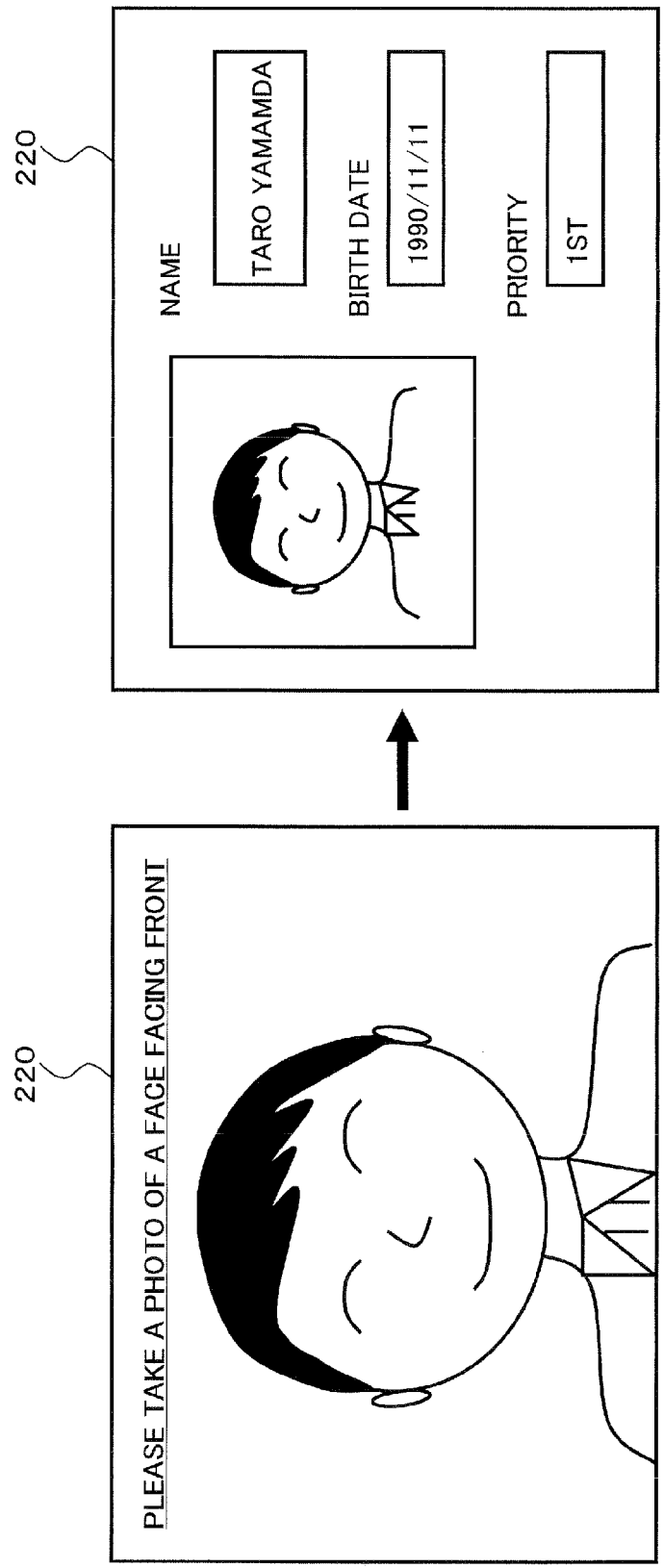

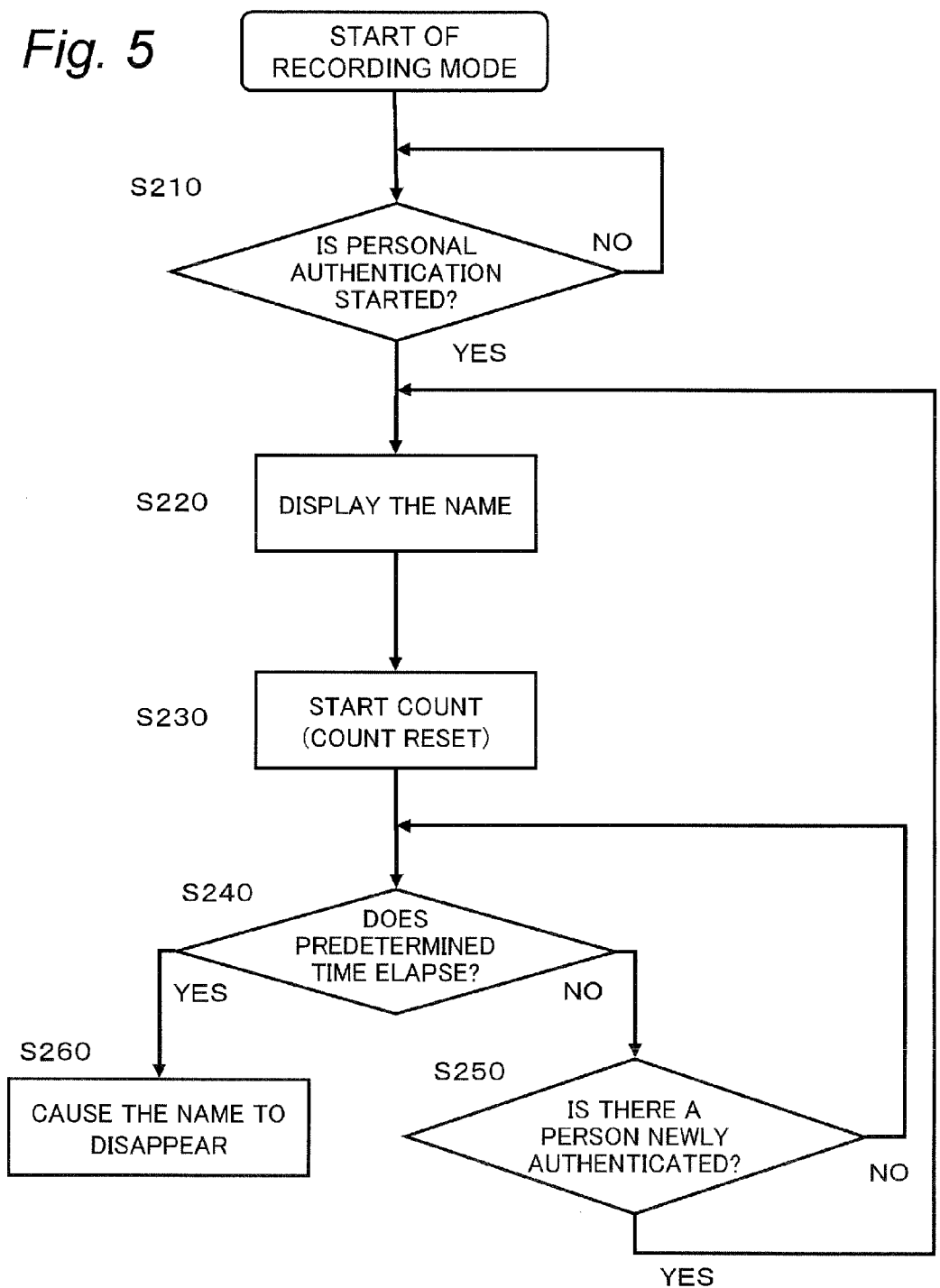

IMAGE APPARATUS PRIORITIZING DISPLAYED ATTRIBUTE INFORMATION FOR RECOGNIZED PEOPLE

BACKGROUND OF THE INVENTION

1. Technical Field

The present invention relates to an imaging apparatus, and more particularly to an imaging apparatus capable of displaying personal information of a persons included in an image.

2. Related Art

Conventionally, electronic cameras to which face recognition technologies are applied are known. For example, JP2006-165822A discloses an electronic camera to which face recognition technologies are applied. In the electronic camera, when a person whose personal information is registered is authenticated, the personal information can be displayed superimposed on a captured image.

When personal information is displayed with the personal information superimposed on a captured image, a user may have difficulty in recognizing the personal information depending on how the personal information is presented, which may rather decrease usability. For example, personal information displayed superimposed on an image may make it difficult to identify the original subject image, or displaying of a plurality of pieces of personal information concurrently may make it difficult to recognize the personal information. In particular, when a user is seeing a through image to determine a composition of an image, the above-described problems may degrade user convenience in terms of recognition of personal information.

SUMMARY

An object is to provide an imaging apparatus capable of displaying personal information of a person included in an image that can improve user convenience in terms of visibility of the personal information.

In a first aspect, an imaging apparatus is provided that includes a storage unit configured to store attribute information about a person and information about a priority of the person with the attribute information associated with the information about a priority, an imaging unit configured to capture a subject to generate image data, and a display unit configured to display attribute information of a person included in an image represented by the image data generated by the imaging unit. When displaying plural pieces of attribute information for a plurality of people with the plurality pieces of attribute information being overlapped, the display unit displays attribute information of a person having a higher priority above attribute information of a person having a lower priority.

According to the invention, when displaying attribute information (e.g. name) for a plurality of people, the attribute information for a person having a higher priority is displayed above the attribute information for a person having a lower priority. By this configuration, the name of a person whose priority is considered to be higher by the user can be presented to the user on a priority basis, enabling improvement of user convenience in the visibility of attribute information.

BRIEF DESCRIPTION OF DRAWINGS

FIGS. 4A and 4B are diagrams for describing a method of registering a face which is to be identified.

FIG. 5 is a flowchart showing a process for displaying a name of an authenticated person in a first embodiment.

DETAILED DESCRIPTION OF PREFERRED EMBODIMENTS

Embodiments will be described below with reference to the accompanying drawings.

First Embodiment

1-1. Overview

A digital video camera 100 according to a present embodiment can identify a face which is registered in advance as an object to be identified in an image which is captured by an imaging device. The digital video camera when identifies the face registered in advance as an object to be identified can display attribute information (e.g. name) related to a person having the face around the face to be identified when displaying a through image on a display monitor.

1-2. Configuration

Figure 1:
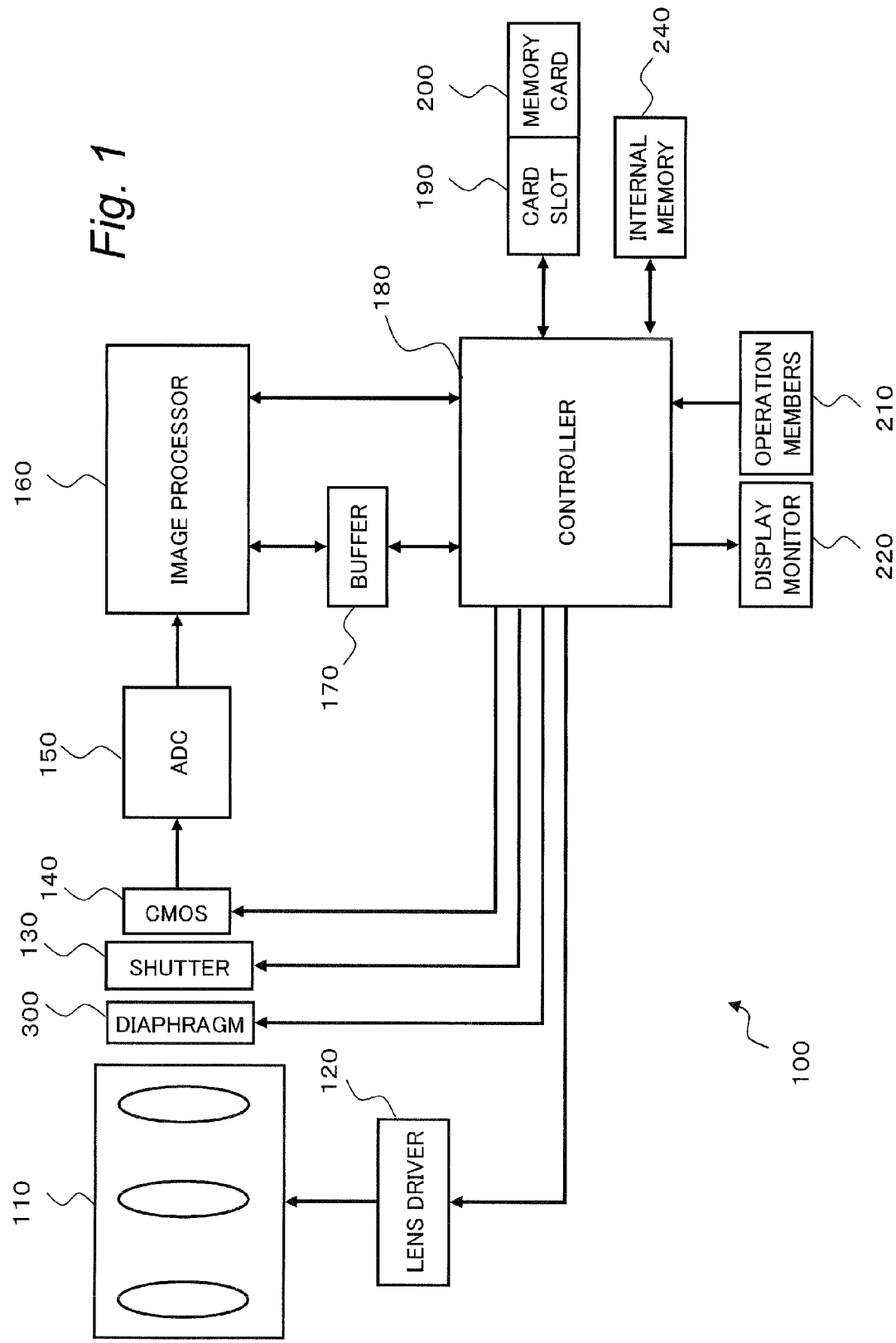
FIG. 1 is a block diagram showing a configuration of a digital video camera of an embodiment.

An electrical configuration of the digital video camera 100 according to the present embodiment is described with reference to FIG. 1. FIG. 1 is a block diagram illustrating a configuration of the digital video camera 100. The digital video camera 100 captures a subject image formed by an optical system 110 composed of one or a plurality of lenses with a CCD image sensor 140. Video data generated by the CCD image sensor 140 is subject to various processes in an image processor 160, and is stored in a memory card 200. The configuration of the digital video camera 100 is described in detail below.

The optical system 110 is composed of a zoom lens and a focus lens. The zoom lens is moved along an optical axis, so that a subject image can be enlarged or reduced. Further, the focus lens is moved along the optical axis so that a focus of a subject image can be adjusted.

A lens driver 120 drives various lenses included in the optical system 110. For example, the lens driver 120 includes a zoom motor for driving the zoom lens and a focus motor for driving the focus lens.

A diaphragm 300 adjusts an aperture automatically or according to user's settings to regulate a quantity of transmitting light.

A shutter 130 is a unit for shielding light to be transmitted through the CCD image sensor 140.

The CCD image sensor 140 captures a subject image formed by the optical system 110 to generate video data. The CCD image sensor 130 performs various operations such as exposure, transfer, and electronic shutter.

An A/D converter 150 converts analog video data generated by the CCD image sensor 140 into digital video data.

By applying the various image processes to video data generated by the CCD image sensor 140, an image processor 160 generates video data to be displayed on a display monitor 220 or generates video data to be stored in the memory card 200. For example, the image processor 160 executes image processes such as gamma correction, white balance correction and damage correction on the video data generated by the CCD image sensor 140. Further, the image processor 160 compresses the video data generated by the CCD image sensor 140 according to a compressing format conforming to the MPEG standards. The image processor 160 can be realized by a DSP (Digital Signal Processor), a microcomputer or the like.

A controller 180 is a control unit for controlling an entire operation of the digital video camera. The controller 180 can be realized by a semiconductor device or the like. The controller 180 may be composed of only hardware, or of a combination of hardware and software. The controller 180 can be realized by a microcomputer or the like. The controller 180 controls the digital video camera 100 with a control mode including a recording mode for capturing a subject and a face registration mode for registering in advance a face of a subject by manual operation.

The controller 180 has a function (face detection function) for detecting a face included in an image represented by the video data generated by the image processor 160. This function is described concretely below. An internal memory 240 stores information about positions of eyes, a nose, a mouth, and so on in a face of a standard person or the like. The controller 180 determines whether an image represented by the video data generated by the image processor 160 includes a portion having a positional relationship similar to the positional relationship among eyes, a nose and a mouth stored in the internal memory 240. When it is determined that it includes the portion having the similar positional relationship, the controller 180 detects, as a face, a predetermined range around the portion.

Further, the controller 180 has a function for determining (personal authentication function) whether a face of the subject represented by the video data generated by the image processor 160 is identical to the face registered preliminarily in the internal memory 240. Specifically, the controller 180 detects the face in the image represented by the video data generated by the image processor 160 (face recognition function). At the time of detecting the face, the controller 180 quantifies and extracts feature amount information representing facial features from the positional relationship among eyes, nose and mouth of the face, a color of the face, an outline of the face, eyebrows, and so on. When the facial feature amount information is extracted, the controller 180 determines whether the extracted feature amount information is similar to the facial feature amount information registered preliminarily in the internal memory 240. Specifically the controller 180 compares a value indicating the quantified feature amount information with a value indicating feature amount information of face stored in the internal memory 240, and determines whether the difference between the values falls within a predetermined range to determine whether both the feature amounts are similar to each other. When the determination is made that they are similar, the controller 180 recognizes that the detected face is identical to the face registered preliminarily in the internal memory 240. On the other hand, when the determination is made that they are not similar, the controller 180 recognizes that the detected face is different from a face that is not registered preliminarily in the internal memory 240. In this manner, the controller 180 can recognize whether the face, or person, identified in the image data is identical to the face, or person, preliminarily stored in the internal memory 240 (personal authentication function).

A buffer 170 functions as a work memory of the image processor 160 and the controller 180. The buffer 170 can be realized by DRAM, a ferroelectric memory or the like.

The memory card 200 can be attached to or detached from a card slot 190. The card slot 190 can be mechanically or electrically connected to the memory card 200. The memory card 200 contains a flash memory or a ferroelectric memory, and can store data such as video data generated by the image processor 160.

The internal memory 240 may be composed of a flash memory, a ferroelectric memory or the like. The internal memory 240 stores a control program for controlling the entire operation of the digital video camera 100, information about a standard positional relationship among eyes, a nose and a mouth to be used for detecting a face, and information about a face registered preliminarily for recognizing a face.

An operation member 210 is a generic name of a user interface for receiving user's operations. For example, it corresponds to, a cross key, a set button, and the like for receiving user's operations.

The display monitor 220 can display an image (through image) represented by the video data generated by the CCD image sensor 140 and an image represented by video data read from the memory card 200. Further, the display monitor 220 can display also various menu screens for performing various settings of the digital video camera 100.

1-2-1. Correspondence of Terms

The internal memory 240 is one example of a storage unit. The CCD image sensor 140 is one example of an imaging unit. The controller 180 is one example of a determination unit. The display monitor 220 is one example of a display unit.

1-3. Face Recognition Function

As described above, the digital video camera 100 has the face recognition function (personal authentication function) for determining whether a face registered preliminarily is identical to a face of a subject captured by the CCD image sensor 140. The digital video camera 100 determines whether a feature amount of a registered face is similar to a feature amount of a face included in a captured video. When it is determined that they are similar, the digital video camera 100 determines that the registered face is identical to the captured face.

Figure 2:
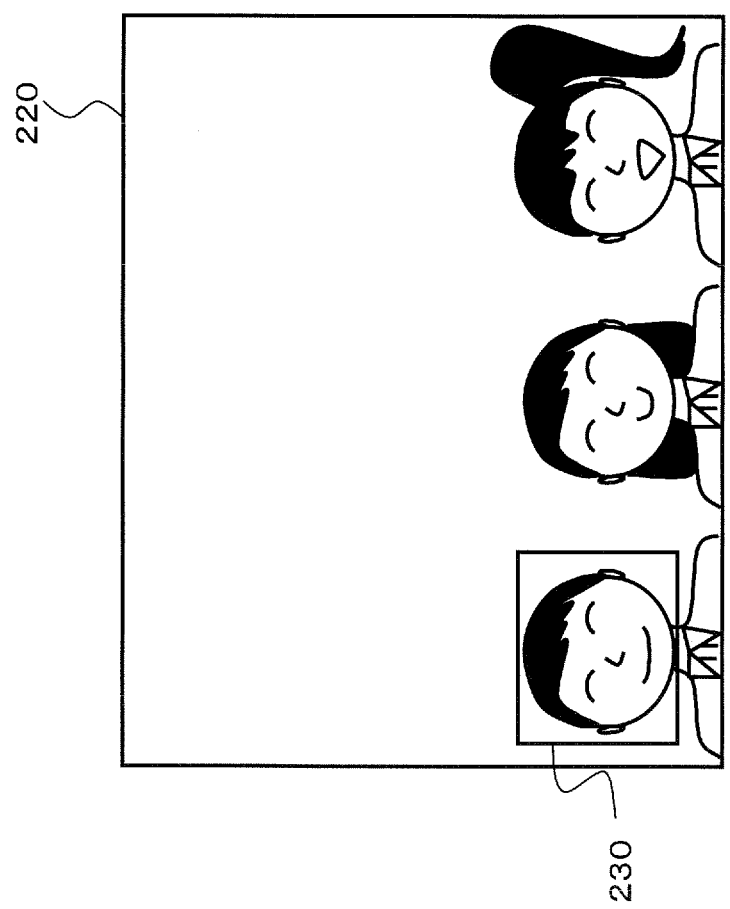
FIG. 2 is a diagram showing a state in which a face frame is displayed around a face of a person to be identified.

The digital video camera 100 determines whether the registered face is present in a captured subject during the operation for capturing the subject. When it is determined that the registered face is present, the digital video camera 100 performs, for example, an operation for focusing on preferentially the registered face. For example, it is assumed that a boy which is a subject on the leftmost side as shown in FIG. 2 is registered preliminarily as an object to be recognized. In this case, the display monitor 220 displays a facial frame 230 around the boy's face, as a recognition object. The digital video camera 100 focuses on the boy's face as the recognition object.

With this function, if there is a subject which is to be preferentially focused on, it is possible to focus preferentially on the subject by registering preliminarily the face of the subject in the digital camera 100.

1-3-1. Registration of Object to be Recognized

Figure 3:
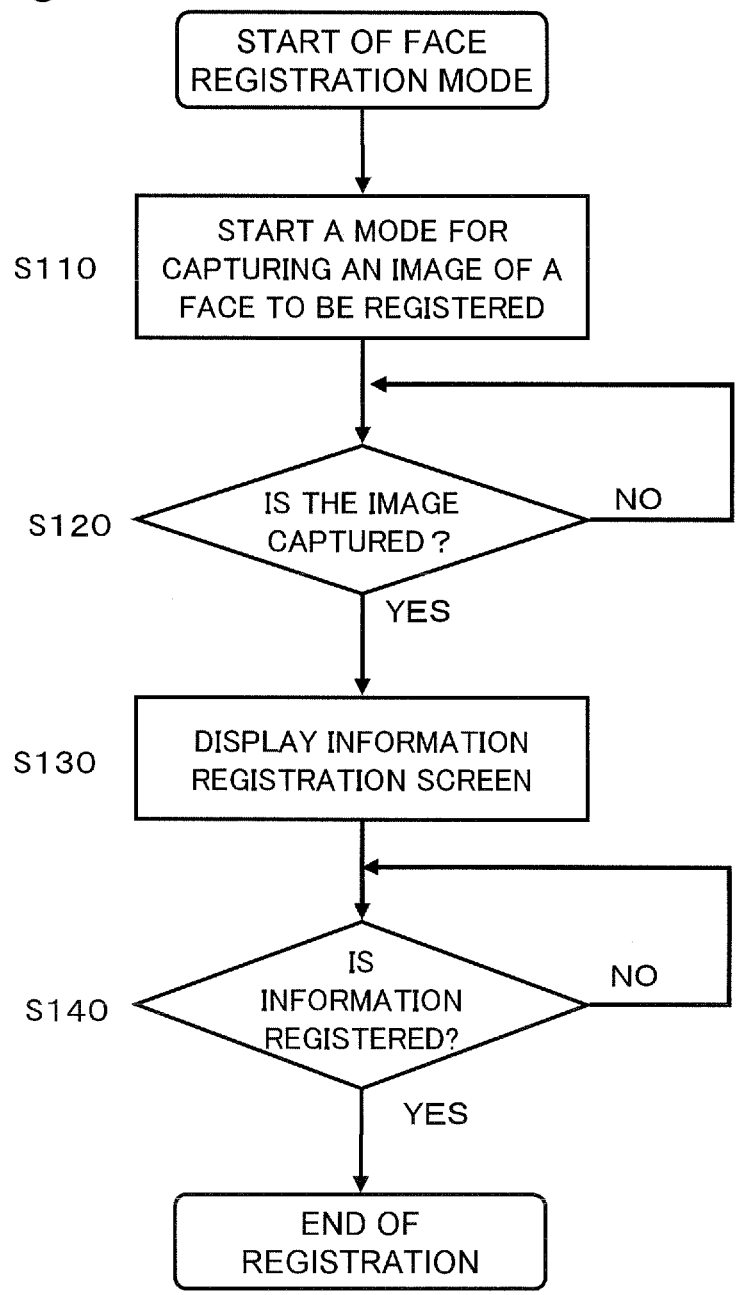
FIG. 3 is a flowchart showing a process of registering a face to be identified, that is performed by the digital video camera.

A method for registering preliminarily a face to be recognized is described with reference to FIGS. 3, 4A and 4B. FIG. 3 is a flowchart describing a method for registering preliminarily a face to be recognized. FIGS. 4A and 4B are diagrams describing the method for registering preliminarily a face to be recognized.

When the user selects a face registration mode for registering a face to be recognized by operating the operation member 210, the face registration mode starts manually. The controller 180 of the digital video camera 100 starts a mode for capturing a face to be registered (face capturing mode) (S110). When the face capturing mode is started, for example, an image shown in FIG. 4A is displayed on the display monitor 220.

The controller 180 determines whether an image of the face to be recognized is taken by the user (S120). The controller stands by until the image of the face to be recognized is taken by the user.

When the image of the face to be recognized is taken by the user, the display monitor 220 displays a screen for prompting the user to enter various information about the recognition object which is to be registered (S130). For example, the display monitor 220 displays a screen for prompting the user to enter information related to name and birth date of the recognition object, and priority information, as shown in FIG. 4B. The priority information is a parameter to be used for determining a face to be preferentially recognized in a case where an image of a plurality of faces which are preliminarily registered are taken.

The controller 180 determines whether the various pieces of information are entered by the user (S140). The controller 180 stands by until the various pieces of information are entered by the user.

When the various pieces of information are entered, the controller 180 records the registered various pieces of information and facial feature amount in the internal memory 240, then ending the face registration mode.

In this manner, the user can register information about the face to be recognized and information about a person related to the face in the digital video camera 100.

1-3-2. Monitor Display Provided when Recording of Images Using Face Recognition Function (Personal Authentication Function)

Figure 6A:
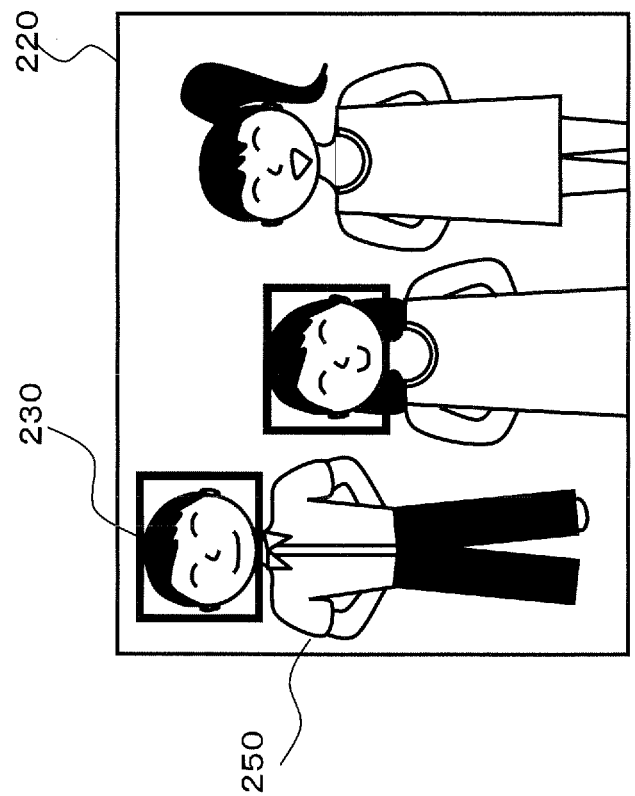
FIGS. 6A and 6B are diagrams describing exemplary displays of a display monitor when displaying a through image in the first embodiment.
Figure 6B:
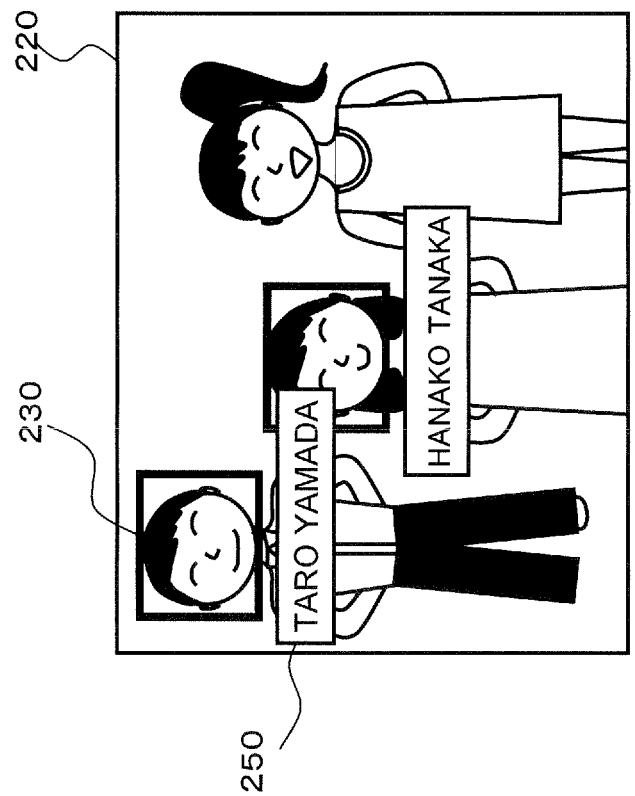

The display operation of the display monitor 220 performed when the digital video camera 100 performs recording of images using the face recognition function (personal authentication function) will be described using FIGS. 5 and 6A and 6B. FIG. 5 is a flowchart of the display operation of the display monitor 220 performed when performing the recording using the face recognition function. FIGS. 6A and 6B are schematic diagrams showing exemplary displays of the display monitor 220.

A user can set the digital video camera 100 to a recording mode by operating a mode setting dial included in the operation member 210. When the digital video camera 100 is set to the recording mode, the controller 180 waits until personal authentication starts (S210). Specifically, the controller 180 detects a face (i.e., a face region) from image data generated by the CCD image sensor 140, and extracts a feature amount of the detected face. When the feature amount is extracted, the controller 180 performs personal authentication by determining whether the extracted feature amount is similar to any one of the feature amounts of persons' faces stored in the internal memory 240. Such a personal authentication process is performed on all of a plurality of extracted feature amounts of faces. That is, personal authentication is performed on a plurality of people (faces).

As a result of the personal authentication, if it is authenticated that the person detected in the image data is the same as the person registered preliminarily (i.e., it is verified that the face detected from the image data is the same as the face registered preliminarily), then the controller 180 controls the display monitor 220 to display the name of the authenticated person, as shown in FIG. 6A (S220). Note that, in the example of FIG. 6A, a name display area (square region) is provided and the name is displayed in the region. The size and shape of the name display area may be fixed or changed according to the number of letters in the name displayed. Although, in the example of FIG. 6A, the background color of the name, i.e., the color of the display area, is set to white and the color of letters displayed is set to black, the background color of the name and the color of letters may be set to other colors. For example, the background color of the name may be set to black and the color of letters displayed may be set to white. In addition, although, in the example of FIG. 6A, the name display area is displayed at a location below the face, the name display region may be displayed at a location above or beside the face. Namely, the method of displaying a name is not limited to that shown in FIG. 6A. When the controller 180 makes the display monitor 220 start displaying the name, the controller 180 starts the count of the elapsed time from the start of the display of the name (S230).

After starting the count of the time, the controller 180 determines based on the count whether a predetermined time has elapsed since the display monitor 220 starts displaying of the name (S240).

If it is determined that the predetermined time elapses, then the controller 180 controls the display monitor 220 to stop displaying the name of the authenticated person (S260). For example, as shown in FIG. 6B, the controller 180 controls the display monitor 220 to cause the display of names to disappear.

On the other hand, if it is determined that the predetermined time has not elapsed yet, then the controller 180 determines whether a new person has been subjected to personal authentication in the image data in addition to the person currently authenticated (S250). If it is determined that a new person has not been subjected to personal authentication, then the controller 180 continues to perform the count of the time. On the other hand, if it is determined that a new person has been subjected to personal authentication, then the controller 180 controls the display monitor 220 to display the name of the new person too (S220). Then, the controller 180 resets and restarts the count of the time from the start of personal authentication of the new person (S230).

As described above, in the digital video camera 100 according to the present embodiment, when a predetermined time has elapsed since the start of display of the name of the person subjected to personal authentication in a through image, the display of the name is stopped. The reasons for such control will be described below.

For example, if a name is displayed at all times while personal authentication is performed, then the user can be notified of the name of a person being captured. However, the display of the name covers a portion of video being actually captured, the user cannot recognize a part of an image being actually captured. Hence, in the present embodiment, after a lapse of a predetermined time from the start of display of the name of a person subjected to personal authentication, the display of the name is stopped. By this control, the user can be informed of the name of a person being currently captured, and can recognize the most part of an image being actually captured almost all the time during the recording.

In addition, when the digital video camera 100 according to the present embodiment starts personal authentication of a new person while performing personal authentication on a person being captured, the digital video camera 100 resets the count of the time from the start of the personal authentication. This control causes the user to be informed of the name of the newly personal-authenticated person for a sufficient time.

1-4. Summary

In the digital video camera 100 according to the present embodiment, when a predetermined time has elapsed since the start of display of the name of a personal-authenticated person in a through image, the display of the name is stopped. By this control, the user can recognize the name (attribute information) of a person whose face has been identified, and can clearly recognize a subject image after the display of the name is stopped, enabling to improve user convenience in visibility of attribute information and a subject image.

2. Second Embodiment

In the present embodiment, another exemplary monitor display operation performed on shooting of an image using the face recognition function will be described. In the present embodiment, in displaying names of plural authenticated people, when there is a possibility of displaying the names with the names overlapped, display of the names is performed such that the name of a person with higher priority appears above the name with lower priority. Note that the hardware configuration of a digital video camera 100 of the present embodiment is the same as that in the first embodiment, and thus, description thereof is omitted here.

Figure 7:
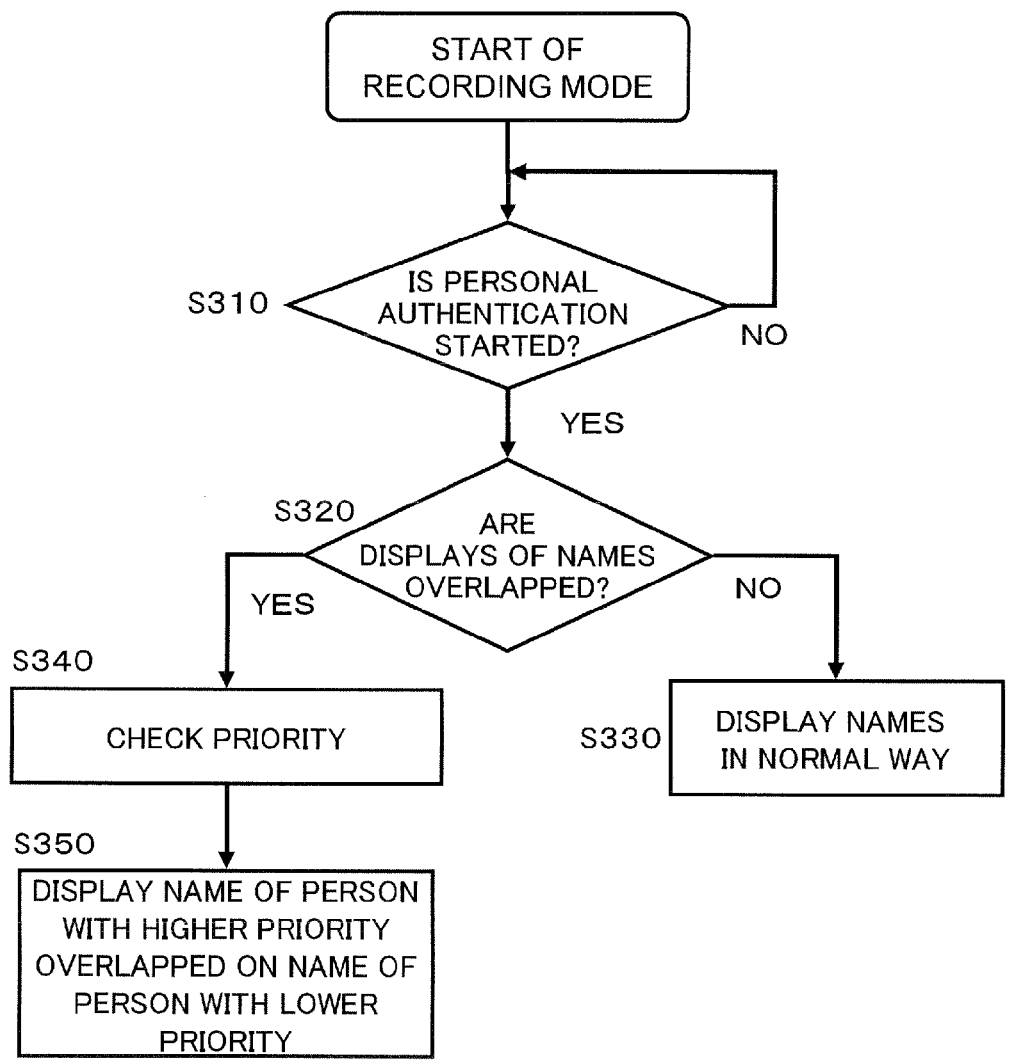
FIG. 7 is a flowchart showing a process for displaying a name of an authenticated person in a second embodiment.
Figure 8B:
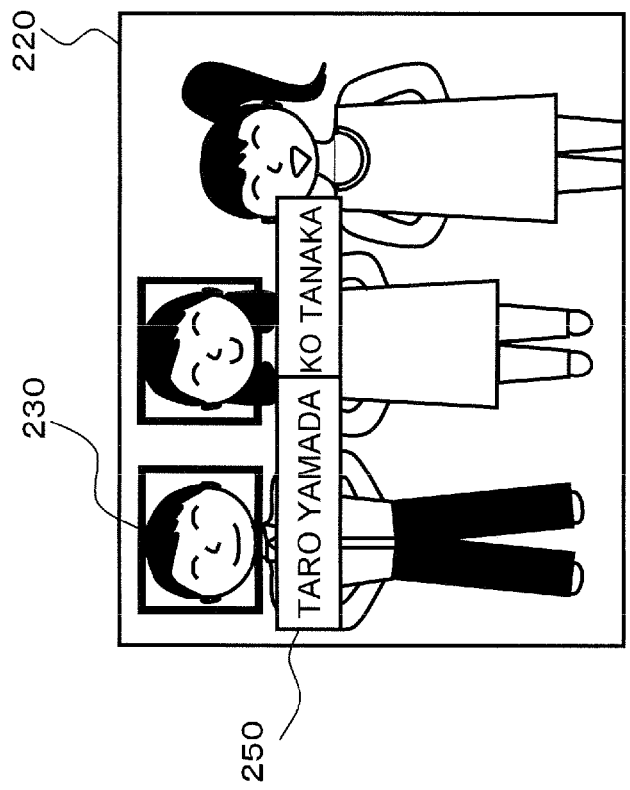
FIGS. 8A and 8B are diagrams describing exemplary displays of a display monitor when displaying a through image in the second embodiment.
Figure 8A:
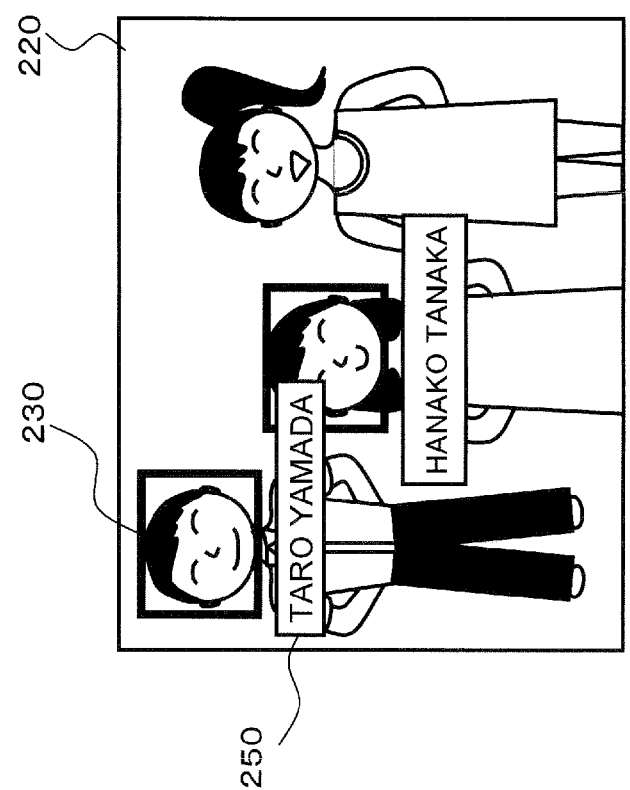

The monitor display operation of the present embodiment performed when performing shooting of an image using the face recognition function (personal authentication function) will be described using FIGS. 7 and 8A and 8B. FIG. 7 is a flowchart for describing a monitor display operation performed when performing shooting of an image using the face recognition function. FIGS. 8A and 8B are schematic diagrams for describing examples of monitor display.

In FIG. 7, when the digital video camera 100 is set to a recording mode by a user, a controller 180 waits until the personal authentication starts (S310).

When the personal authentication starts, the controller 180 determines whether a plurality of people (subjects) are authenticated. If it is determined that a plurality of persons have been authenticated, then it is determined whether there is a possibility that displays of the names of the plurality of authenticated persons may overlap each other (S320). In the present embodiment, it is defined that a name of a person is displayed at a predetermined location below an area of a face of the person with reference to the location of the face area. Thus, by determining the locations of face areas of the plurality of authenticated people, it can be determined whether displays of the names overlap each other.

If it is determined that there is no possibility that displays of the names may overlap each other, then the controller 180 controls a display monitor 220 to display the names of the authenticated people by a normal display method (S330). For example, the controller 180 controls the display monitor 220 to provide display such as that shown in FIG. 8A.

On the other hand, if it is determined that there is a possibility that displays of the names may overlap each other, then the controller 180 checks the priorities of the respective people subjected to personal-authentication (S340). Specifically, the controller 180 checks the priorities by accessing priority information stored in the internal memory 240.

When the priorities are checked, the controller 180 controls the display monitor 220 such that the name of a person with a higher priority is displayed above the name of a person with a lower priority (S350). For example, the controller 180 controls the display monitor 220 to provide the display as shown in FIG. 8B. In the example of FIG. 8B, "TARO YAMADA" is set with a higher priority than "HANAKO TANAKA", and thus the name "TARO YAMADA" is displayed above the name "HANAKO TANAKA". Specifically, a part of the name "HANAKO TANAKA" is covered by the display of "TARO YAMADA".

Figure 9:
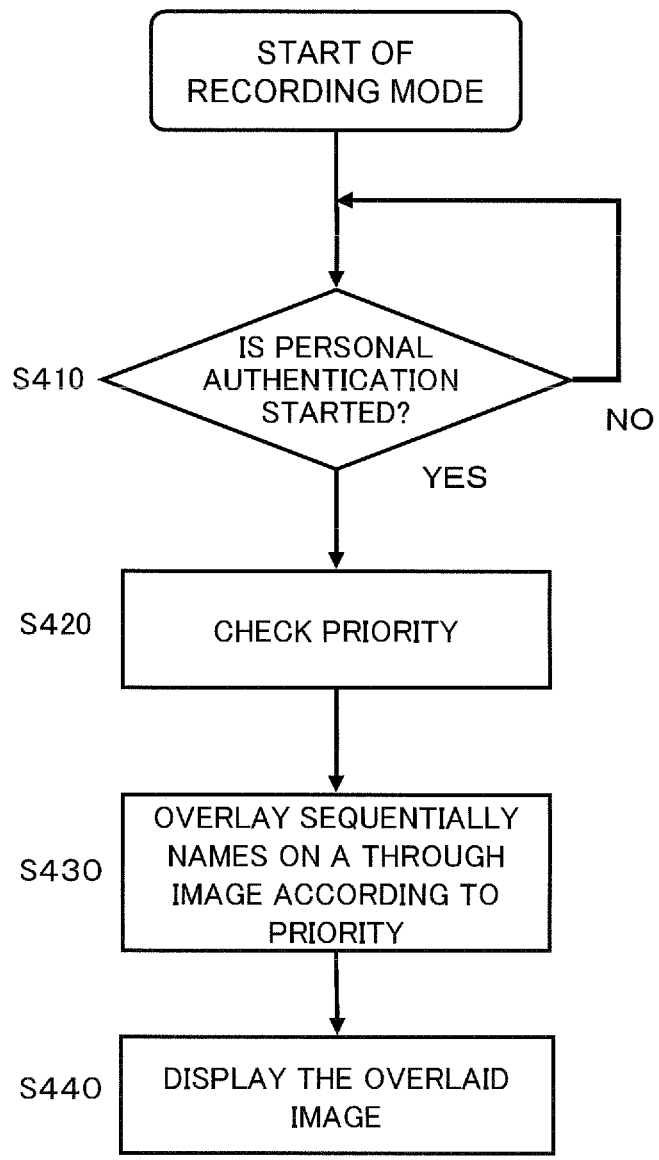
FIG. 9 is a flowchart showing another example of the process for displaying a name of an authenticated person in the second embodiment.

Note that, instead of the process shown in FIG. 7, a process shown in FIG. 9 is also considered, as another example of a process to display the name of a person with a higher priority above the other when a plurality of people are authenticated.

In FIG. 9, when the digital video camera 100 is set to the recording mode, the controller 180 waits until the personal authentication starts (S410).

When the personal authentication starts, the controller 180 determines whether a plurality of people have been authenticated. If it is determined that a plurality of people have been authenticated, then the controller 180 checks the priorities of the respective people subjected to personal-authentication (S420). Then, the controller 180 overlays the names of the people in ascending order of priority on an image captured by a CCD image sensor 140 to generate the through image data (S430). For example, when, as in the example shown in FIG. 8B, "TARO YAMADA" has a higher priority than "HANAKO TANAKA", first, the name "HANAKO TANAKA" is overlaid on an image captured by the CCD image sensor 140, and then the name "TARO YAMADA" is overlaid. In general, in overlaying images, since an image overlaid later overwrites an image overlaid first, the image overlaid later is displayed above the image overlaid first. Hence, by thus overlaying the names of people in ascending order of priority, the name of a person with a high priority is consequently displayed above the other.

Thereafter, the controller 180 controls the display monitor 220 to display the overlaid through image data (S440).

As such, in the digital video camera 100 according to the present embodiment, when the names of a plurality of people subjected to personal authentication are displayed and there is a possibility that the names of the plurality of people may be overlapped and displayed, the priority of each person which is set in advance is checked, and the name of a person with a higher priority is displayed above the name of a person with a lower priority with the names overlapped. By this arrangement, the digital video camera 100 can present preferentially the name of a person whose priority is considered to be higher by the user to the user.

Note that, when displays of names overlap each other, a name displayed above and/or the background color of the name display area may be translucent so that a name displayed below can be visually recognized. Note also that, although, in the above-described example, when there is a possibility that displays of names may overlap each other, the name of a person with a higher priority is displayed more above, the display location of the name of a person with a lower priority may be shifted such that the names do not overlap each other.

As described above, in the digital video camera 100 according to the present embodiment, when displaying attribute information (e.g., name) about a plurality of people, attribute information about a person with a higher priority is displayed above than attribute information about a person with a lower priority. By this configuration, the name of a person whose priority is considered to be higher by the user can be presented to the user on a priority basis, enabling to improve user convenience in the visibility of attribute information.

3. Third Embodiment

In the present embodiment, a configuration of a digital video camera 100 to which both the idea of the first embodiment and the idea of the second embodiment are applied will be described. The hardware configuration of the digital video camera 100 of the present embodiment is the same as that in the first embodiment, and thus, description thereof is omitted here.

Figure 10:
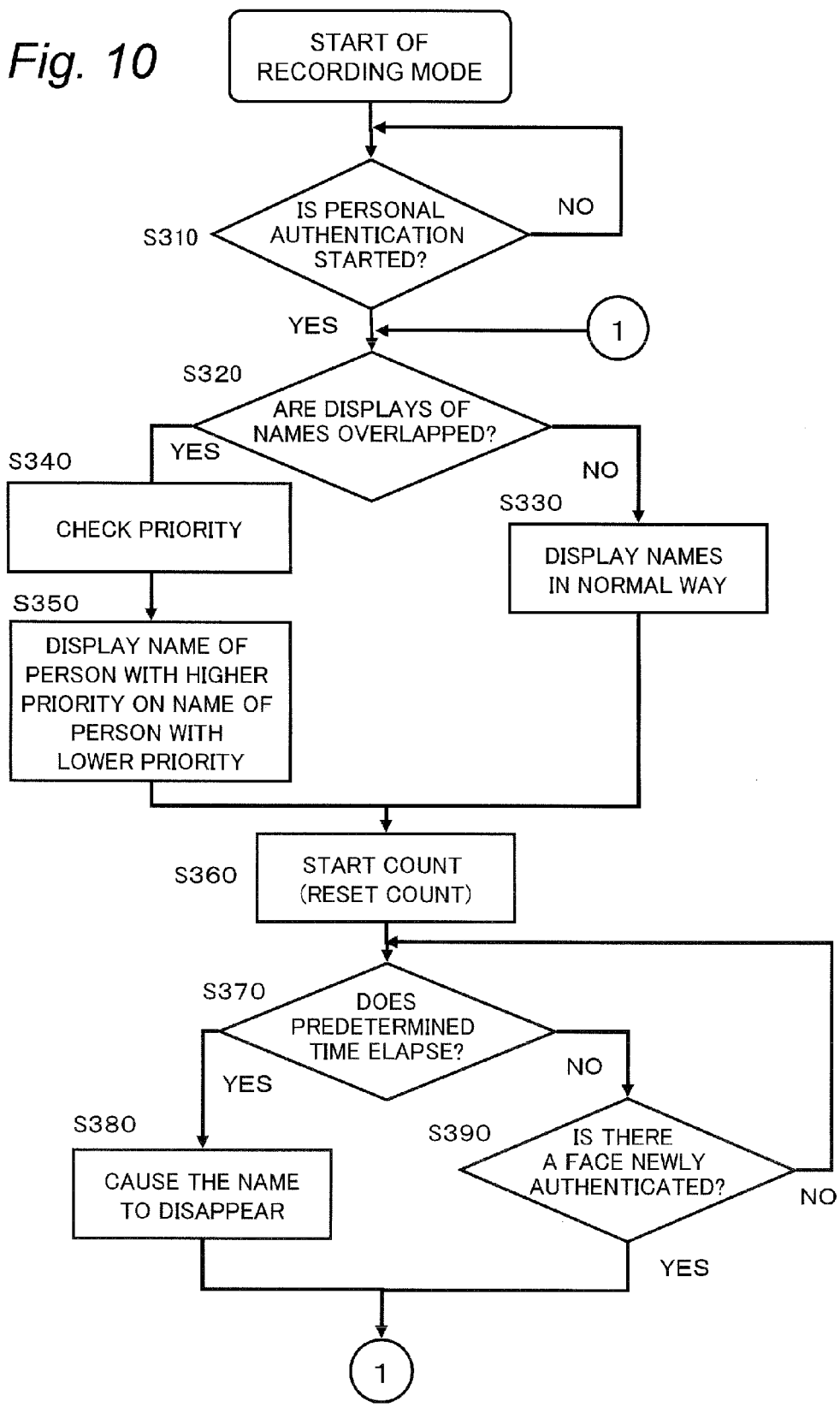
FIG. 10 is a flowchart showing a process for displaying a name of an authenticated person in a third embodiment.

FIG. 10 is a flowchart for describing the monitor display operation of the present embodiment performed when performing shooting of an image using the face recognition function. The monitor display operation of the present embodiment performed when performing shooting using the face recognition function will be described using FIG. 10.

Referring to FIG. 10, when the digital video camera 100 is set to the recording mode by a user, a controller 180 waits until the personal authentication starts (S310).

When the personal authentication starts, the controller 180 determines whether a plurality of people (subjects) have been authenticated in the personal authentication. If it is determined that a plurality of people have been authenticated, then the controller 180 determines whether there is a possibility that displays of the names of the plurality of people may overlap each other (S320).

If it is determined that there is no possibility that displays of the names may overlap each other, then the controller 180 controls a display monitor 220 to display the names of the authenticated people by a normal display method (S330).

On the other hand, if it is determined that there is a possibility that displays of the names may overlap each other, then the controller 180 checks the priorities of the respective people subjected to personal-authentication (S340). When the priorities are checked, the controller 180 controls the display monitor 220 such that the name of a person with a higher priority is displayed above the name of a person with a lower priority (S350). The above-described process is the same as that described in the second embodiment.

Thereafter, the controller 180 starts the count of the time elapsed since the start of the display of the names (S360). After starting the count of the time, the controller 180 determines based on the count whether a predetermined time has elapsed since the display monitor 220 starts displaying the names (S370).

If it is determined that the predetermined time has elapsed, then the controller 180 controls the display monitor 220 to stop displaying the names of the authenticated people (S380). Thereafter, the processing returns to step S320.

On the other hand, if it is determined that the predetermined time has not elapsed, then the controller 180 determines whether a new person has been authenticated in addition to the persons currently authenticated (S390). If it is determined that a new person has not been authenticated, then the controller 180 continues to count the time. On the other hand, if it is determined that a new person has been authenticated in the personal authentication, then the controller 180 controls the display monitor 220 to display also the name of the new person (S320). Then, the controller 180 resets and restarts the count of the time from the start of personal authentication of the new person (S360).

Note that the process shown in FIG. 10 is a combination of the process of the first embodiment shown in FIG. 5 and the process of the second embodiment shown in FIG. 7. Here, instead of the process of the second embodiment shown in FIG. 7, the process shown in FIG. 9 may be combined with the process of the first embodiment shown in FIG. 5. Specifically, in the process shown in FIG. 10, steps S420 to S440 shown in FIG. 9 may be inserted instead of steps S320 to S350. As described above, the idea of the first embodiment and the idea of the second embodiment can be combined.

4. Other Embodiments

As the embodiments of the present invention, the first to third embodiments are described above. However, the present invention is not limited thereto. Hence, other embodiments of the present invention will be described in this section.

Although in the above-described embodiments a CCD image sensor 140 is exemplified as an imaging unit, the imaging unit is not limited thereto. For example, the imaging unit may be composed of a CMOS image sensor or an NMOS image sensor.

An image processor 160 and a controller 180 may be composed of a single semiconductor chip or may be composed of different semiconductor chips.

Although, in the above-described embodiments, the controller 180 is configured to perform face detection and face recognition, the controller 180 does not necessarily need to be configured in this manner. For example, a chip that performs face detection and face recognition may be provided separately from the controller 180. Alternatively, a chip that performs face detection and a chip that performs face recognition may be different.

Although, in the above-described embodiments, a name is displayed as the attribute information of an authenticated person, other attribute information (address, sex, blood type, and so on.) may be displayed in addition to or instead of the name.

INDUSTRIAL APPLICABILITY

The above-described embodiments can be applied to an imaging apparatus having a face recognition function, such as a digital video camera and a digital still camera.

What is claimed is:
1. An imaging apparatus comprising:
   a storage unit configured to store attribute information about a person and information about a priority of the person, the information about the priority of the person being stored with the attribute information about the person associated with the information about the priority;
   an imaging unit configured to capture a subject to generate image data; and
   a display unit configured to display the attribute information about the person included in an image represented by the image data generated by the imaging unit, the attribute information being displayed at any position around a face of the person,
   wherein, when displays of a plurality of pieces of the attribute information for a plurality of people are to be overlapped by the display unit, the display unit displays the attribute information of a person, of the plurality of people, having a higher priority over the attribute information of a person, of the plurality of people, having a lower priority, such that the attribute information of the person having the higher priority at least partially covers the attribute information of the person having the lower priority, and wherein, after the display unit displays the attribute information of the person having the higher priority so as to at least partially cover the attribute information of the person having the lower priority and when the displays of the plurality of pieces of attribute information for the plurality of people become to not overlap, the display unit displays each of the plurality of pieces of attribute information regardless of the priority of each of the plurality of people.

2. The imaging apparatus according to claim 1, wherein the storage unit stores the attribute information about the person, a feature amount indicating feature of a face of the person, and the information about the priority of the person, the attribute information about the person, the feature amount, and the information about the priority being associated with each other, wherein the imaging apparatus further comprises:

an extracting unit configured to extract the feature amount indicating the feature amount of the face included in the image data generated by the imaging unit; and a determining unit configured to determine, based on the feature amount extracted by the extracting unit, whether a person related to the extracted feature amount is the same as the person related to the feature amount stored in the storage unit, and wherein, when the determining unit determines that the person related to the extracted feature amount is the same, the display unit displays the attribute information about the person associated with the feature amount.

3. The imaging apparatus according to claim 2, further comprising an overlay unit configured to overlay the attribute information on the image data generated by the imaging unit to generate data for display, wherein the display unit displays the data for display generated by the overlay unit, and wherein, when generating data for display to display the attribute information for the plurality of people, the overlay unit overlays the attribute information on the image data generated by the imaging unit in ascending order of the priority of the person to generate the data for display.

4. The imaging apparatus according to claim 1, wherein the attribute information is a name of the person.

5. The imaging apparatus according to claim 2, wherein the attribute information is a name of the person.

6. An imaging apparatus comprising:

a storage unit configured to store attribute information about a person and information about a priority of the person, the information about the priority of the person being stored with the attribute information about the person associated with the information about the priority of the person;

an imaging unit configured to capture a subject to generate image data; and a display unit configured to display the attribute information about the person included in an image represented by the image data generated by the imaging unit, the attribute information being displayed at any position around a face of the person, wherein, when displays of a plurality of pieces of the attribute information for a plurality of people are not to be overlapped, the display unit displays each of the plurality of pieces of the attribute information regardless of a priority of each of the plurality of people, and wherein, after the display unit displays each of the plurality of pieces of the attribute information and when the displays of the plurality of pieces of the attribute information become to overlap, the display unit displays the attribute information of a person, of the plurality of people, having a higher priority over the attribute information of a person, of the plurality of people, having a lower priority, such that the attribute information of the person having the higher priority at least partially covers the attribute information of the person having the lower priority.

* * * * *